United States Patent

[11] 3,572,727

[72] Inventor Harold Fredric Greiner
         Warwick, R.I.
[21] Appl. No. 842,203
[22] Filed July 16, 1969
[45] Patented Mar. 30, 1971
[73] Assignee Sealol Inc.
         Warwick, R.I.

[54] UNLOADING GAS BARRIER FACE SEAL
3 Claims, 1 Drawing Fig.

[52] U.S. Cl. ................................................. 277/74,
                                        277/75, 277/85, 277/91
[51] Int. Cl. .................................................. F16j 15/40,
                                        F16j 15/54
[50] Field of Search ........................................ 277/3, 27,
                                        74, 75, 91, 83, 85

[56] References Cited
UNITED STATES PATENTS
2,679,412  5/1954  Whitfield ........................ 277/74
2,895,750  7/1959  Gardner et al. ................ 277/3
3,347,604  10/1967  Lavelle et al. ................. 277/71

FOREIGN PATENTS
1,485,742  5/1967  France ........................ 277/74

*Primary Examiner*—Samuel B. Rothberg
*Attorney*—William Frederick Werner

ABSTRACT: This specification discloses a dry running gas seal for gas processing systems in which a rotating shaft enters a high pressure area. The seal comprises a mating ring presenting a seal face and a seal ring providing two concentric seal faces engaging the seal face on the mating ring and cooperating therewith to define a pressure cavity. A chamber for an inert barrier gas is provided in a fixed housing and communicates with a supply of inert gas under pressure. The seal ring has throttling passage between the barrier gas chamber and the pressure cavity. The seal ring is biased towards the mating ring by springs mounted in the housing. These springs provide the loading force under which the seal faces are urged together. Increase in the pressure of the barrier gas is transmitted through the passages to increase the pressure of the gas in the pressure cavity. This increase results in a decrease of the loading forces.

PATENTED MAR 30 1971
3,572,727
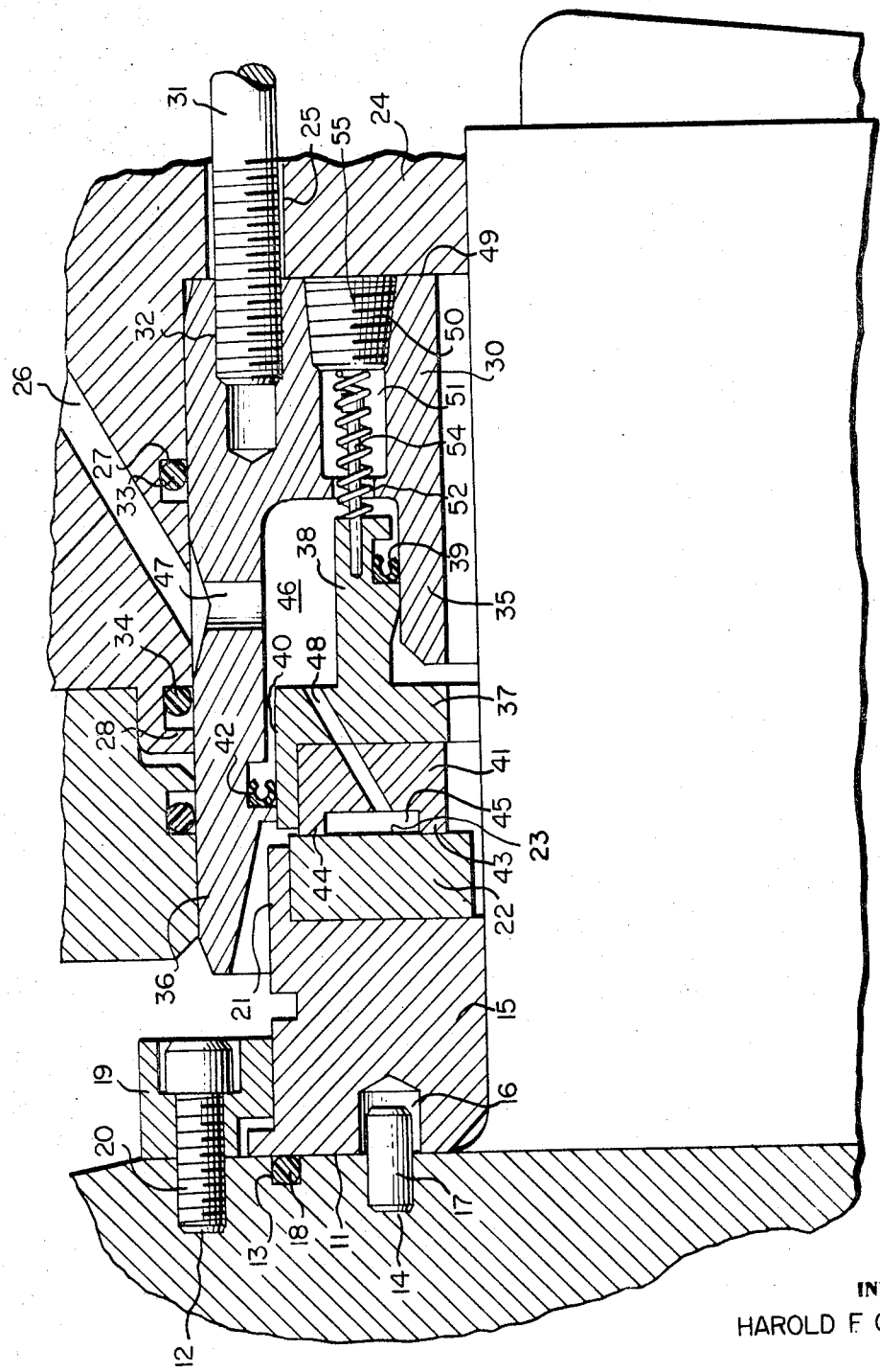
INVENTOR
HAROLD F. GREINER
BY William Frederick Werner
ATTORNEYS

UNLOADING GAS BARRIER FACE SEAL

The present invention relates to a seal for a rotating shaft which enters a pressurized area and which includes a mating ring and a seal ring having engaging seal faces. The invention is concerned primarily with an inert barrier gas seal for said faces.

BACKGROUND OF THE INVENTION

Where a rotating shaft enters a pressurized area through a fixed housing in which it is mounted, it has been the practice to utilize a seal commonly known as a labyrinth seal. Such a seal is satisfactory where large leakage and reduced efficiency is acceptable. However, where toxic, expensive and hazardous gases are being handled, no leakage of the sealed medium is acceptable. Under such conditions it has been the practice to employ some type of face seal.

A face seal which has met with some acceptance is a liquid barrier face seal. Such a seal includes, as characteristic elements, a mating ring fixed to a shaft and presenting a seal face normal to the shaft axis. A seal ring having two concentric seal faces is urged towards the mating ring by springs. These faces cooperate with the seal face of the mating ring to define a cavity that receives a liquid barrier. This liquid may be water, oil or any liquid that is compatible with the material being handled and which will lubricate the seals.

Such a liquid barrier seal affords certain advantages in that heat is dissipated and the gas being sealed is buffered to prevent leakage. However, it is also accompanied by certain disadvantages in that care must be exercised in selecting a liquid which is compatible with the operating conditions. These are the ranges of operating temperatures and the ability of the process gas being sealed to accommodate slight leakage of the barrier liquid into the gas without adverse effects.

Dry running gas seals have also been proposed; however, known seals of this type are subject to unpredictable leakage and are limited to low pressure in increased proportion to the speed of relative movement between the seal faces. This results in short service life and a decrease in dependability.

OBJECTS OF THE INVENTION

This invention has, as its primary object, the provision of a dry running gas seal which obviates the above outlined unsatisfactory conditions which attend the use of a liquid barrier seal and known dry running face seals.

Another object is to provide a dry running gas seal including a barrier of an inert gas which will not react with, or have any deleterious affects on the process gas, should there be slight leakage of the barrier gas into the process gas.

A further object is to provide, in a face seal of the character aforesaid, a pressure cavity between a mating ring and a seal ring which contains an inert barrier gas and communicates with a source of the barrier gas under pressure whereby an increase in the pressure of the barrier gas results in a decrease of the loading forces urging said mating and seal rings into engagement.

SUMMARY OF THE INVENTION

The foregoing objects are attained by the inert barrier gas face seal of this invention which comprises a mating ring secured to a rotating shaft and having a seal face normal to the axis of the shaft; a sealing ring biased towards the mating ring by springs generating loading forces and having two concentric seal faces engaging the seal face of the mating ring and cooperating therewith to define a pressure cavity; and a barrier gas chamber communicating with the pressure cavity by throttling passages and which contains an inert gas under pressure from a supply source. Increase in the pressure of the barrier gas is effective in the pressure cavity to decrease the loading forces on the seal faces.

Various other more detailed objects and advantages of the invention such as arise in connection with carrying out the above noted ideas in a practical embodiment will in part become apparent and in part be hereinafter stated as the description of the invention proceeds.

For a full and more complete understanding of the invention, reference may be had to the following description and accompanying drawing wherein:

The FIGURE is a longitudinal section through a portion of a shaft, the housing in which it is mounted, and the inert barrier gas seal of this invention.

Referring now to the drawing, a shaft 10 is formed with a shoulder 11 having a series of sockets 12, an annular groove 13, and a series of recesses 14 opening thereonto. A mating ring 15 is fitted over shaft 10 with an end face in engagement with shoulder 11. Recesses 16 open onto this end face and pins 17 in aligned recesses 14 and 16 achieve a loose positioning of ring 15 on shaft 10. A static seal in the form of O-ring 18 is received in groove 13 and is engaged by ring 15.

A retaining ring 19 encircles mating ring 15 and is secured in position by headed screws 20 anchored in sockets 12. Mating ring 15 is formed with a skirt 21 which defines a recess receiving a component 22 of a material particularly adapted to the conditions of usage. Thus, it may be of carbon compacted under high pressure. This component 22 of mating ring 15 presents a seal face 23 normal to the axis of shaft 10.

A housing 24 is disposed about shaft 10 and is formed with a series of openings 25, a duct 26 which communicates with a supply of an inert gas under pressure, and annular grooves 27 and 28.

A sealing ring carrier 30 is secured in housing 24 by screw bolts 31 which pass through openings 25 and are anchored in sockets 32. Static seals in the form of O-rings 33 and 34 are positioned in grooves 27 and 28 and are engaged by carrier 30 to seal the joinder of carrier 30 to housing 24.

Carrier 30 has an inner flange 35 the free end of which is spaced from component 22 of mating ring 15. It also has a longer outer flange 36 that extends about mating ring 15 from which it is spaced.

A sealing ring 37 has an intermediate flange 38 extending towards housing 24 and which rides on flange 35. A dynamic seal in the form of O-ring 39 received in an annular groove in flange 38 seals this connection. Sealing ring 37 has an outer skirt 40 which encircles a sealing ring component 41 of the same material as component 22 of mating ring 15. An O-ring 42 is an annular groove on the inner surface of flange 36 engages skirt 40 and provides a dynamic seal.

Sealing ring component 41 is formed with concentric flanges 43 and 44 which present seal faces normal to the shaft axis and in engagement with seal face 23. They cooperate with the latter to define a pressure cavity 45.

Carrier 30 and its flange 36, together with sealing ring 37 and its flange 38 define a chamber 46. An opening 47 in flange 36 communicates between duct 26 and chamber 46.

Sealing ring 37 and its component 41 are formed with throttling passages 48 which communicate between pressure cavity 45 and chamber 46.

Carrier 30 has an end face 49 which engages housing 24. Opening into this end face are a plurality of threaded counterbars 50 terminating in recesses 51. The bottom walls of the latter have openings 52 through which pass expansion springs 53 coiled about stems 54. The inner ends of the latter are anchored in the end face of flange 38. Plugs 55 are screwed into counterbars 50 and close recesses 51.

In describing the operation of the subject gas barrier face seal, it is noted that any gas such as air, argon, nitrogen or other gas that is compatible with the process gas is supplied from an appropriate source through duct 26 and passage 47. This gas is the barrier gas which is under a pressure in the nature of one atmosphere.

The barrier gas passes from chamber 46 through passages 48 to pressure cavity 45. In this cavity the pressure of the barrier gas tends to separate components 22 and 41 of the mating and sealing rings. Thus, the pressure of the barrier gas relieves the loading forces of springs 53 which urge the faces of flanges 43 and 44 against face 23. It is evident that as the pressure of the barrier gas increases the loading forces decrease.

While a preferred specific embodiment of the invention is hereinbefore set forth, it is to be clearly understood that the invention is not to be limited to the exact constructions, mechanisms, and materials illustrated and described because various modifications of these details may be provided in putting the invention into practice.

I claim:

1. In an unloading gas barrier face seal designed for use with a shaft rotatably mounted in a housing and entering an area of pressurized gas:
   a. a mating ring secured to the shaft and having a seal face normal to the axis of said shaft:
   b. a carrier in said housing having an annular flange:
   c. a sealing ring axially movable in said carrier and having an annular flange engaging said flange on said carrier, said sealing ring being movable relative to said mating ring, said housing and sealing ring cooperating to define a chamber;
   d. a passage in said housing for introducing an inert barrier gas under pressure into said chamber;
   e. a pair of spaced concentric flanges on said sealing ring presenting seal faces engaging the seal face of the mating ring and cooperating therewith to define a pressure cavity between said mating and sealing rings:
   f. a throttling passage in said sealing ring communicating between said chamber and said pressure cavity; and
   g. spring means mounted in said carrier and effective on said sealing ring to urge said sealing ring towards said mating ring where loading forces on said engaging seal faces are generated, said loading forces being opposed by the pressure of the barrier gas in the pressure cavity.

2. The unloading gas barrier face seal of claim 1 in which the spring means comprises a plurality of angularly spaced expansion coil springs mounted in the carrier and engaging the sealing ring.

3. The unloading gas barrier face seal of claim 1 in which the carrier has an outer annular flange spaced from the flange on the sealing ring and cooperating therewith to define the chamber.